United States Patent
Salte

[19]

[11] Patent Number: 5,850,790
[45] Date of Patent: Dec. 22, 1998

[54] SEED TINE ASSEMBLY

[75] Inventor: Torstein Salte, Kleppe, Norway

[73] Assignee: Kverneland Klepp AS, Kvernaland, Norway

[21] Appl. No.: 860,738

[22] PCT Filed: Oct. 30, 1996

[86] PCT No.: PCT/GB96/02640

§ 371 Date: Jul. 2, 1997

§ 102(e) Date: Jul. 2, 1997

[87] PCT Pub. No.: WO97/16955

PCT Pub. Date: May 15, 1997

[30] Foreign Application Priority Data

Nov. 9, 1995 [GB] United Kingdom .................. 9522950

[51] Int. Cl.⁶ ............................................. A01C 5/00
[52] U.S. Cl. ........................ 111/149; 111/123; 172/723
[58] Field of Search .............................. 111/52, 123, 73, 111/124, 152, 186, 80, 188, 189, 149; 172/720, 722, 723, 725, 730, 719

[56] References Cited

U.S. PATENT DOCUMENTS

| 4,373,455 | 2/1983 | Friggstad | 111/186 X |
|---|---|---|---|
| 4,388,878 | 6/1983 | Demzin | 111/186 |
| 4,445,445 | 5/1984 | Sterrett | 111/186 X |
| 4,446,801 | 5/1984 | Machnee et al. | 111/86 |
| 4,502,547 | 3/1985 | MacIntyre | 111/186 X |
| 4,669,922 | 6/1987 | Hooper et al. | 406/157 |
| 4,770,112 | 9/1988 | Neumeyer | 111/186 X |
| 4,926,767 | 5/1990 | Thomas | 111/187 |
| 5,136,954 | 8/1992 | Fetaz et al. | 111/186 X |
| 5,562,054 | 10/1996 | Ryan | 111/186 X |

FOREIGN PATENT DOCUMENTS

| 1271668 | 7/1990 | Canada | A01C 5/00 |
|---|---|---|---|

*Primary Examiner*—Thomas B. Will
*Assistant Examiner*—Robert Pezzuto
*Attorney, Agent, or Firm*—Workman, Nydegger, & Seeley

[57] ABSTRACT

A seed tine assembly for mounting on a frame component of a seed drilling implement and comprising a tine having an upper end mounted on the frame component, and a lower soil-engaging end; a seed share mounted on the tine at the lower end; a tine point mounted on the lower end of the tine; a supply tube mounted on the share and having an upper end receiving an air-driven supply of seed and a lower end which distributes seed into the furrow formed by the share; in which the lower end of the tine is angled, as seen in side view, having a base leg detachably secured to the share, and an upright leg to which the tine point is detachably secured; and in which the share comprises a share plate which is generally triangular, as seen in plan, and a distributor plate is mounted on the share plate and has a socket arranged to receive the lower end of the supply tube.

14 Claims, 3 Drawing Sheets

5,850,790

SEED TINE ASSEMBLY

BACKGROUND OF THE INVENTION

1. The Field of the Invention

This invention relates to a seed tine assembly for mounting on a frame component of a seed drilling implement.

2. The Relevant Technology

A seed drilling implement with which the seed tine assembly of the invention can be used may be a "direct drilling machine" which, as will be well known to those of ordinary skill in the art, is a machine which can introduce seed directly into previously unworked soil i.e. after harvesting of a previous crop, and when there will be stubble and plant residuals remaining anchored in t he soil surface. Direct drilling gives certain advantages, and is being used to an increasing extent in circumstances in which previous practice of a) ploughing, b) harrowing, and c) then seeding, are no longer thought to be suitable.

However, it should be understood that a seed tine assembly according to the invention may be provided also in a seed drilling implement of the type which is intended to be used after previous working of the soil.

A seed tine assembly is usually mounted on a rigid part of the frame of a seed drilling implement, and comprises a downwardly extending tine for working the soil, a seed share mounted on the lower end of the tine and arranged to form a temporary furrow in the soil, and at least one seed distribution tube arranged to supply seed under pneumatic pressure to the share and then to be directed into the furrow in the soil.

The action of the share is to form a required temporary furrow below the surface, into which the seed is introduced, and usually the soil above the seed is then pressed downwardly by a following tool, such as a packer wheel or a roller.

The action of the share is to form a required temporary furrow below the surface, into which the seed is introduced, and usually the soil above the seed is then pressed downwardly by a following tool, such as a packer wheel or a roller.

There are different designs of share to be mounted on the tine, and one known type is referred to as a "wing point share."

A general problem, in the design of seed tine assemblies, concerns the way in which the component parts are connected together at the lower end of the tine, in that there is only a limited amount of space available to complete the necessary assembly and fastening operations. Therefore, it has been normal practice in the past for many (if not all) of the separate component parts to be permanently assembly as an integrated assembly e.g. by welding or forging together. This provides a robust and reliable assembly, but suffers from the significant cost disadvantage to the user that, when an unacceptable level of wear occurs in one only of the major components of the assembly (and which will usually be one of the component parts which is exposed to the greatest extent of abrasive load), it is necessary to replace the entire assembly. There is therefore a clear customer need for an improved design of seed tine assembly, which can be readily assembled, but in a way which allows for relatively simple removal of any worn part, and replacement with a new part.

OBJECTS AND BRIEF SUMMARY OF THE INVENTION

According to one aspect of the invention there is provided a seed tine assembly for mounting on a frame component of a seed drilling implement, said assembly comprising:

- a tine having an upper end which is intended to be mounted on the frame component of the implement, and having a lower soil-engaging end;
- a seed share mounted on the tine at said lower end, and arranged to form a furrow in the soil below the surface of the soil;
- a tine point mounted on the lower end of the tine and projecting downwardly therefrom; and
- a supply tube mounted on the share and projecting upwardly therefrom, said tube having an upper end which is intended to receive an air-driven supply of seed and a lower end arranged to distribute the seed into the furrow formed by the share;
- in which the lower end of the tine is angled, as seen in side view, having a base leg which is detachably secured to said share, and an upstanding leg to which the point is detachably secured.

The angled lower end of the tine can be formed by forging of the tine into the required shape, and this angle is generally L-shaped, and the angle between the base leg and the upright leg can be up to and including 90°.

Preferably, the share comprises a share plate which is generally triangular in shape, as seen in plan, and with one comer of the triangular shape being located adjacent to the tine point.

A distributor plate may be mounted on the share plate, and includes a socket mounting into which the lower end of the supply tube can be received.

In a preferred arrangement, a pair of supply tubes is provided, arranged one behind the other, and also behind the tine, so as to present a combined width of tine and tubes which is as small as possible, to minimize resistance to passage through the soil and the possibility of becoming tangled with straw, stubble, and other plant material present when direct drilling is undertaken.

Each tube preferably has a lower discharge outlet angled to direct seed laterally outwardly, in relatively opposite directions, so that two laterally spaced seed rows can be formed in the furrow.

At least some of the tubes (or pairs of tubes) may be arranged to be closable, so as to provide parallel non-seeded strips of ground. The spacing apart of the non-seeded strips will be determined according to (a) the spacing apart of the wheels of the tractor which is used to carry out subsequent crop spraying and (b) the spraying width of the implement being propelled by the tractor for crop spraying. This is desired practice to avoid waste of seed, by preventing seeding in strips of the field along which the wheels of the tractor can pass during subsequent crop spraying. The operator will chose selected ones of the distribution tubes to provide a required pattern of non-seeded strips.

The share may have a rear socket arranged to receive a further supply tube which may be supplied with fertilizer, for use when it is desired to carry out simultaneously a combined seed drilling and fertilizing operation. The rear socket may be provided in an additional mounting plate which is assembled with the share plate and the distributor as a stack of plates.

According to a second aspect of the invention there is provided a seed tine assembly for mounting on a frame component of a seed drilling implement, said assembly comprising:

- a tine having an upper end which is intended to be mounted on the frame component of the implement, and having a lower soil-engaging end;
- a seed share mounted on the tine and arranged to form a furrow in the soil below the surface of the soil;

a tine point mounted on the lower end of the tine and projecting downwardly therefrom; and a supply tube mounted on the share and projecting upwardly therefrom, said tube having an upper end which is intended to receive an air-driven supply of seed and a lower end arranged to distribute seed into the furrow formed by the share;

in which the share comprises a share plate which is generally triangular, as seen in plan, and a distributor plate mounted on the share plate and having a socket arranged to receive the lower end of the supply tube.

Preferably, the socket provided on the distributor plate is capable of receiving a pair of supply tubes, arranged one behind the other.

In a particularly preferred embodiment, the lower end of the tine is angled, and the tine point is detachable secured to a profiled shape defined on an upright leg of the angle via a selected one of a pair of longitudinally spaced mountings arranged on the upright leg, whereas the base leg of the angle is detachably mounted on the share plate. The tine point is subjected to heavy abrasive load, and its tip tends to wear quite quickly, and therefore initially it will be mounted on the upright leg of the lower end of the tine via a higher one of its mountings, and then when a certain level of tip wear has occurred, the tine point can then be detached, and re-mounted via the lower of the mountings, so that the worn tip of the tine is now projecting to a greater extent below the level of the end of the tine.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
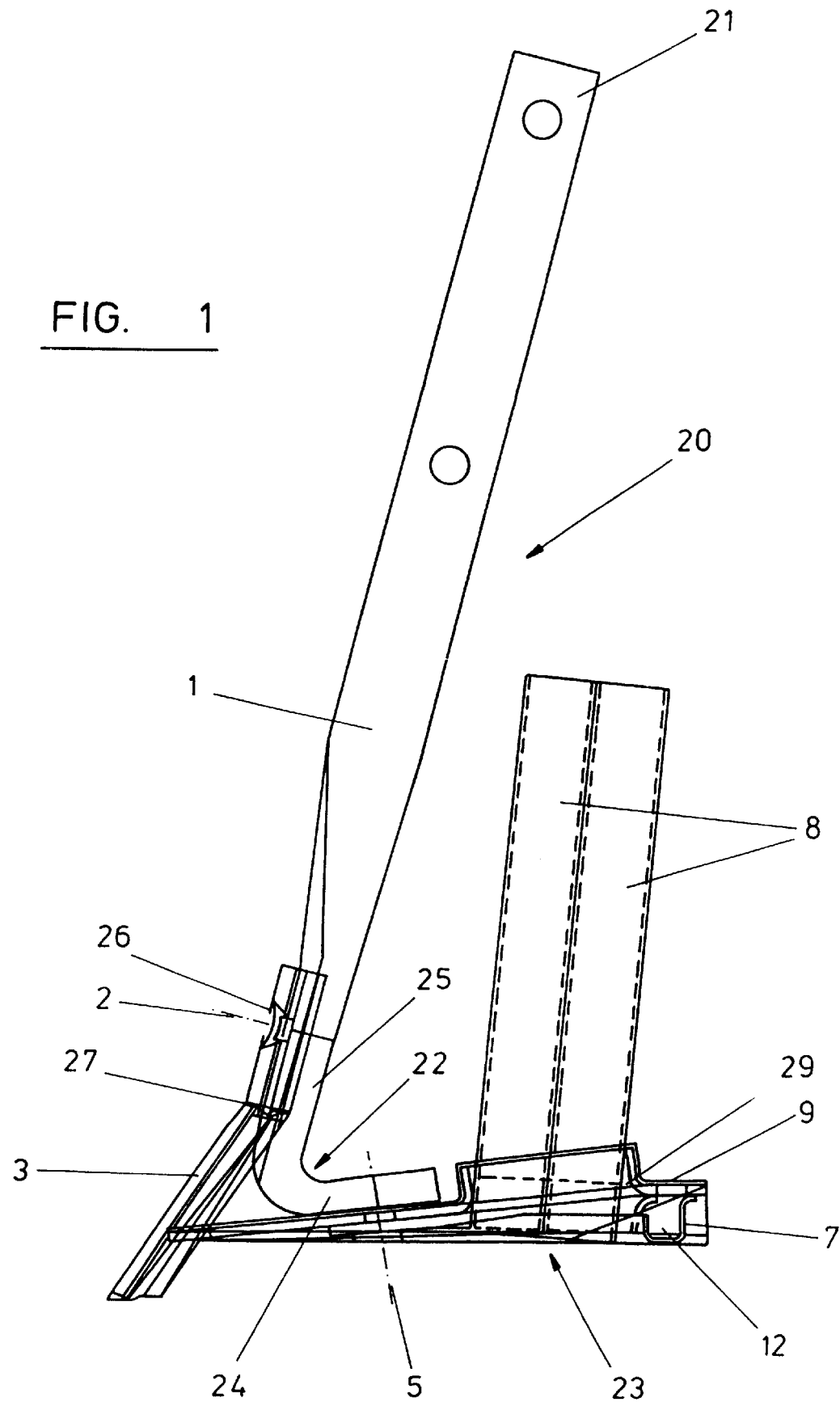
FIG. 1 is a side view of a first embodiment.
Figure 2:
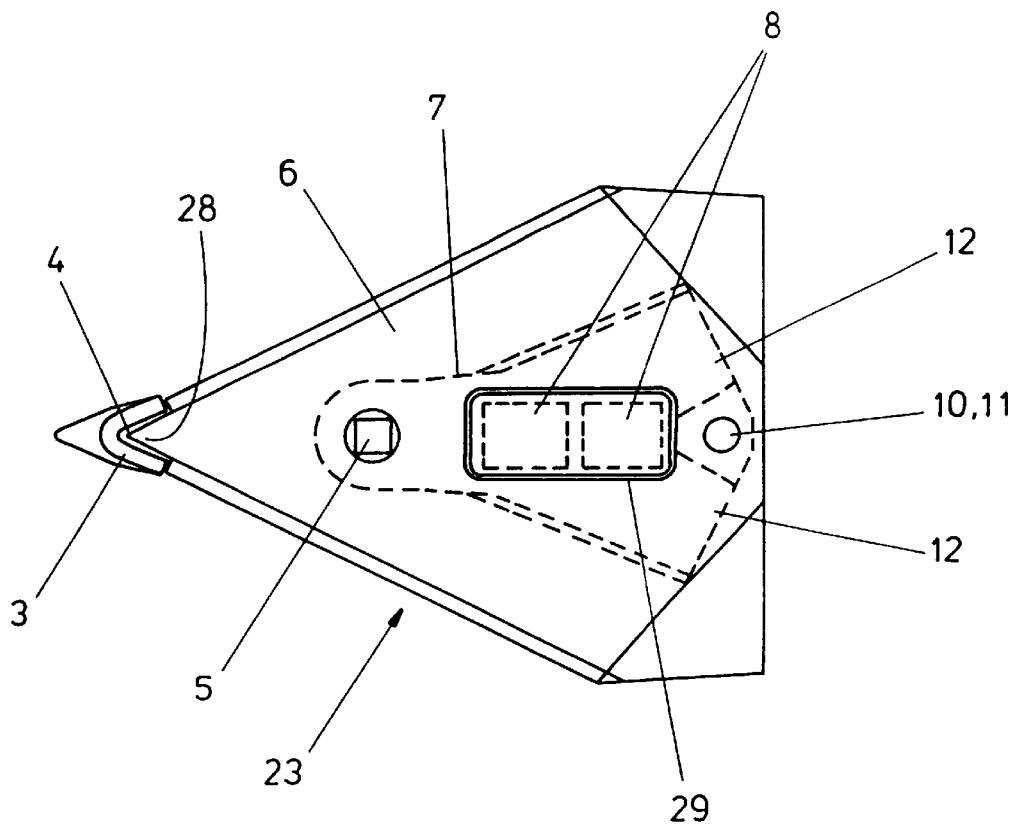
FIG. 2 is a plan view of a share and seed distribution tube assembly to be provided at the lower end of the tine.
Figure 3:
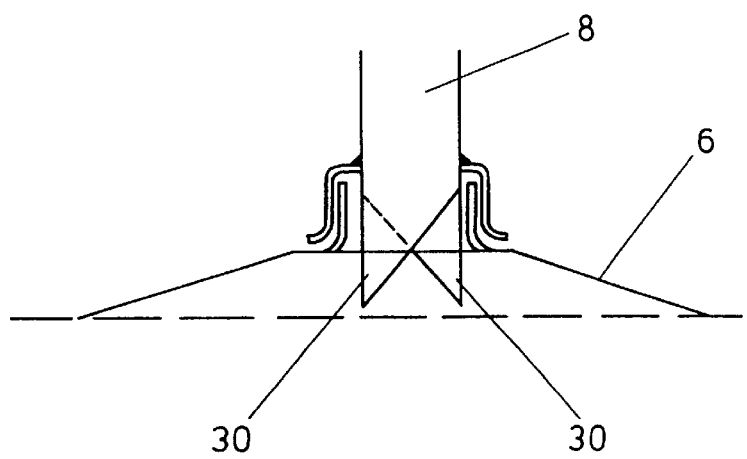
FIG. 3 is a rear view of the share assembly.

Referring first to FIGS. 1 to 3 of the drawings, there is shown a first embodiment of seed tine assembly which is designated generally by reference 20, and which is intended to be mounted on any suitable frame component of the frame of a seed drilling implement. The implement may be a direct drilling machine, or a seed drill of the type which is intended primarily to carry out formation of seed drills in already worked soil.

The assembly 20 comprises an upright shank which forms a tine 1 which has an upper end 21 which is intended to be mounted on the frame component, and a lower soil-engaging end 22. A seed share assembly 23 is mounted on the tine 1 at the lower end 22, and is arranged to form a furrow in the soil below the surface of the soil, during forward movement of the tine 1 through the ground. The lower end 22 of the tine 1 is angled, generally into an L-shape, having a base leg 24 and an upright leg 25. Conveniently, this shape of the tine is achieved by forging, which provides a suitably strong construction.

A tine point 3 is detachably mounted on the lower end 22 of the tine 1, and projects downwardly therefrom. A pair of longitudinally spaced mounting points 26 and 27 are provided along the length of the upright leg 25, and a bolt 2 can be used in order to fasten the tine point 3 detachably to the upright leg 25 of the tine 1. Initially, the tine point 3 will be mounted via the upper mounting 26, and then when a certain degree of tip wear has occurred, the tine point 3 can be detached, and re-mounted via the lower mounting 27, so that the worn tip is now at a lower level, and further use of the partly worn tine point can continue.

The share assembly 23 comprises a profiled share plate 6 which is triangular, as seen in plan, and with one apex 28 being located adjacent to the tine point 3. A distributor plate 7 is detachably mounted on the share plate 6, and includes a socket mounting 29 into which the lower end of one or more seed supply tubes can be received. In the illustrated and particularly preferred embodiment, a pair of supply tubes 8 are mounted one behind the other, and directly behind the tine 1, so as to present a combined width of tine and tubes which is as small as possible, to minimize resistance to passage through the soil, and the possibility of becoming tangled with straw, stubble and other plant residuals when direct drilling is being undertaken. The seed distribution tubes 8 are preferably welded to a plate (9) that fits on the upper side of the seed share and with holes for suitable fixing screws (not shown in detail).

Each tube 8 has a lower discharge outlet 30 (see FIG. 3) which is angled to one side, and the outlets 30 face in opposite directions, so that two laterally spaced seed rows can be formed in the furrow. At least some of the tubes (or pairs of tubes) may be arranged to be closable, so as to provide parallel non-seeded strips of ground. The spacing apart of the non-seeded strips will be determined according to the particular crop spraying implement which is used subsequent to drilling of the seed. Since it is undesirable to run the tractor wheels over pre-seeded strips of ground, which can cause waste of seed by poor or nongermination, it is usual practice to deliberately provide parallel non-seeded strips of ground, during the seed drilling operation, and the spacing apart of the non-seeded strips is determined according to the spacing apart of the wheels of the tractor used to propel the crop spraying implement, together with consideration off the actual spraying width of the implement.

The preferred embodiment of seed tine assembly according to the invention therefore has a number of significant technical advantages, by means of the novel design and mode of assembly. Thus, only a single bolt 2 is required to secure the tine point 3, and to provide a stable fixing of the tine point 3, a groove 4 is formed in the tine point 3, having a matching profile to that of the triangular profile applied to the forward face of the upright leg 25 at the lower end of the tine 1. As mentioned above, two mounting positions are provided on the tine point 3, to receive the bolt 2.

There is only one single additional bolt 5 which is required to complete the assembly with the tine of: the share plate 6, the distributor plate 7, the seed tubes 8 and mounting plate 9.

At the rear of the share assembly 23, share plate 6, distributor plate 7 and mounting plate 9 are held together in rigid assembly by provision of aligned mounting holes 10, through which a single bolt 11 is taken to hold the plates together. Furthermore, to provide a stable fixing assembly of the plates 7, 8 and 9, the apex 28 of the triangular share plate 6 fits into the angled groove 4 formed in the rear face of the tine point 3.

The arrangement of the distribution tube 8, one behind the other, has the advantage of minimizing the width profile of the assembly, as mentioned above, but has a further advantage over a possible side-by side arrangement. Thus, a side-by side arrangement of the tubes 8 would require provision of a dividing wall upstanding from the middle of the distributor plate 7. However, with the tubes 8 arranged one behind the other, not only does this reduce the overall width of the parts which have to engage into the soil (and therefore apply frictional drag), but by cutting the tube ends at an angle, seed can be blown to one side from one of the tubes, and to the other side from the other tube. The distributor plate 7 is formed in such a way that there is no requirement for the dividing wall in the middle, and is formed with two lateral discharge outlets 12 at the rear end thereof.

One advantage of cutting each tube at an angle is that this provides a large outlet, and therefore the assembly of the share and the seed distribution tubes can be used for many different types of seed, ranging in size from small seeds such as rape, up to large seeds e.g. beans and peas. The provision of two separate tubes provides for better control over the distribution of seed, and in addition by allowing either tube to be closed when required, a single seed distribution row may be formed when field marking is required for assistance of subsequent application of fertilizer or crop spraying.

Figure 4:
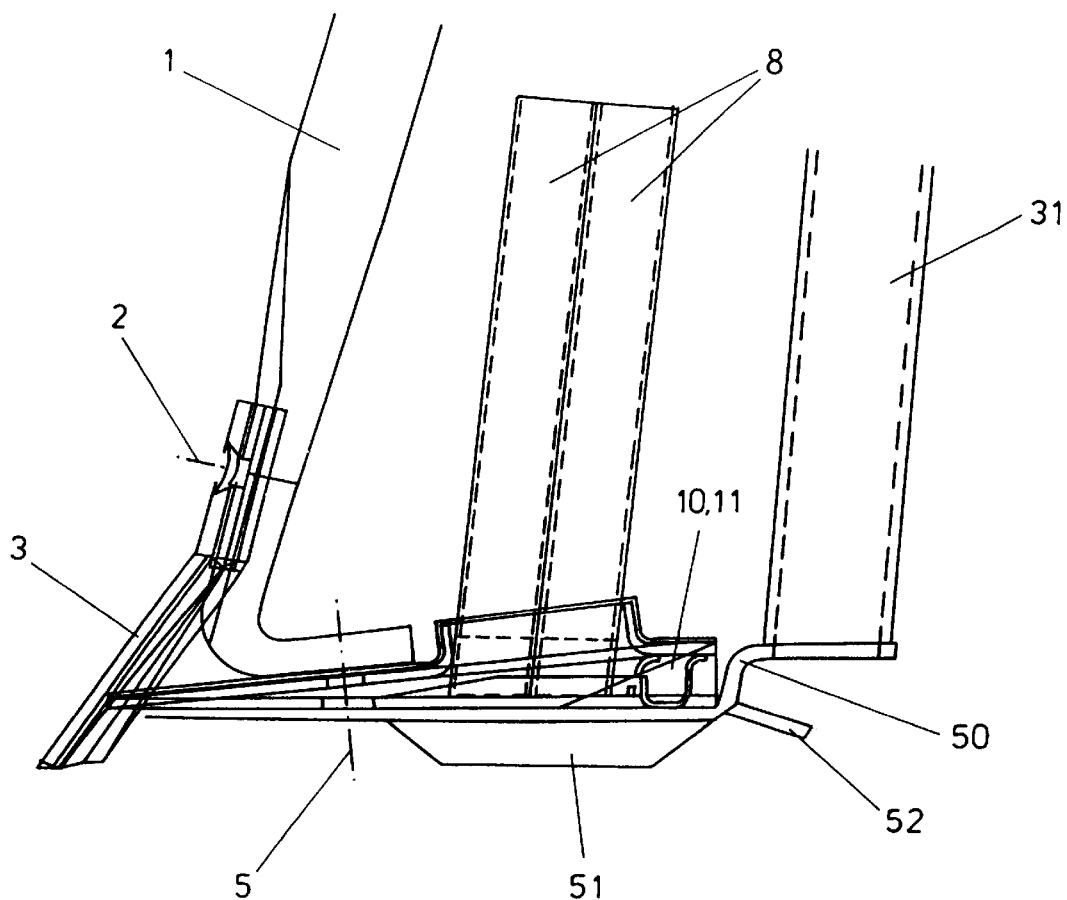
FIG. 4 is a side view, similar to FIG. 1 showing a second embodiment with an additional component.
Figure 5:
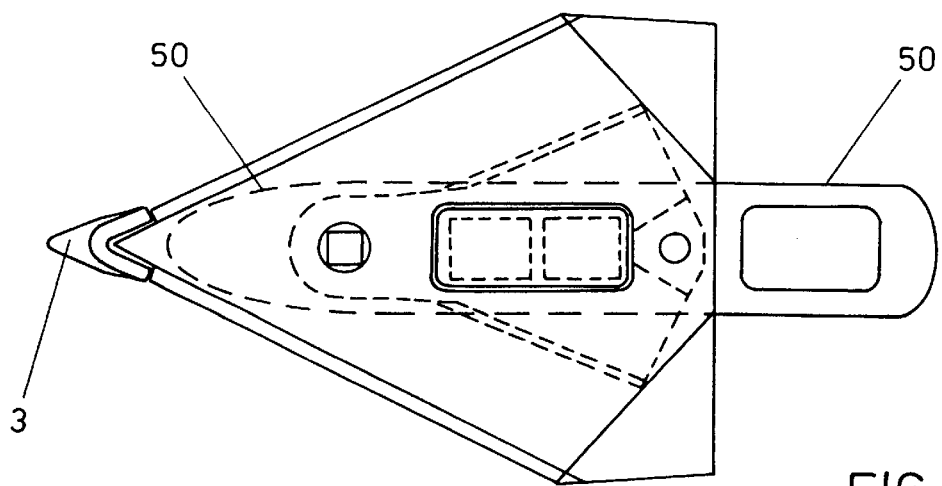
FIG. 5 is a plan view of the share assembly of the second embodiment show in FIG. 4.

A modified embodiment is shown in FIGS. 4 and 5, and in which corresponding parts are given the same reference numerals, and need not be described again. This embodiment has an additional component incorporated in the share assembly at the lower end of the tine 1, namely a mounting at the rear of the assembly into which a fertilizer tube 31 can be mounted. This enables a simultaneous action of seed drilling and fertilizer application during each pass of the implement.

The fertilizer tube 31 is mounted in a socket which is carried by an additional mounting plate 50, which is assembled with the share plate 6 and distributor plate 7 in a stack, with the mounting plate 50 being the lowermost in the stack. The stack of plates is held in assembly by the bolts 5 and 11.

In addition, as shown in FIGS. 4 and 5, a vertically extending profile plate 51 is provided on the underside of the mounting plate 50, which extends throughout a depth almost as deep as the tip of the point 3, but having a narrower width than that of the tine point 3. The purpose of the profile 51 is to hold the furrow open until introduction of the fertilizer via tube 31. There is also a rearwardly projecting plate 52, of approximately the same width as profile plate 51, and which also has a purpose of holding the furrow open until the fertilizer has been introduced, but in addition prevents clogging of the outlet end of the tube 31 when the implement is being put into the right working position in the soil.

What is claimed and desired to be secured by United States Letters Patent is:

1. A seed tine assembly for mounting on a frame component of a seed drilling implement, said assembly comprising:
   a tine having an upper end which is intended to be mounted on the frame component, and having a lower soil-engaging end;
   a seed share mounted on the tine at the lower end, and arranged to form a furrow in the soil below the surface of the soil;
   a tine point mounted on the lower end of the tine and projecting downwardly therefrom; and
   a supply tube mounted on the share and projecting upwardly therefrom, said tube having an upper end which is intended to receive an air-driven supply of seed and a lower end arranged to distribute seed into the furrow formed by the share;
   in which the lower end of the tine comprises a onepiece generally L-shaped member having a base leg which is detachably and mechanically secured to the share, and an upright leg to which the tine point is detachably secured.

2. An assembly according to claim 1, in which the tine is forged, to form the L-shaped lower end.

3. An assembly according to claim 1, in which the share includes a share plate which is generally triangular in shape, as seen in plan, and with one corner of the triangular shape being located adjacent to the tine point.

4. An assembly according to claim 3, including a distributor plate mounted on the share plate, and including a socket mounting into which the lower end of the supply tube can be received.

5. An assembly according to claim 4, including a pair of supply tubes, arranged one behind the other, and received by said socket mounting.

6. An assembly according to claim 5, in which the supply tubes have lower discharge outlets angled to direct seed laterally outwardly in relatively opposite directions, so that two laterally spaced seed rows can be formed in the furrow.

7. An assembly according to claim 1, in which the share has a rear socket which receives a further supply tube which can be supplied with fertilizer, so as to carry out simultaneous application of fertilizer during seed drilling.

8. An assembly according to claim 4, in which a mounting plate is assembled with said share plate and said distributor plate to form a stack of plates, and is provided with a rear socket in which a fertilizer tube is mounted.

9. An assembly according to claim 1, in which the tine point is detachably mounted on the lower end of the tine via a selected one of a pair of longitudinally spaced mountings provided on the lower end of the tine.

10. An assembly according to claim 1, including a fastener which is operative releasably to couple the share to an angled base leg of the tine.

11. An assembly according to claim 1, in which the supply tube is secured to a mounting plate, and in which the mounting plate is detachably assembled with a share plate, and a distributor plate of the share, via a common fastening taken through aligned mounting holes at the rear of the plates.

12. A seed tine assembly for mounting on a frame component of a seed drilling implement, said assembly comprising:
   a tine having an upper end which is intended to be mounted on the frame component, and having a lower soil-engaging end;
   a seed share mounted on the tine and arranged to form a furrow in the soil below the surface of the soil, the seed share terminating at a front apex;
   a tine point mounted on the lower end of the tine and projecting downwardly therefrom, the tine point having an inside face with a groove formed thereon, the apex of the seed share being received within the groove of the tine point; and a supply tube mounted on the share and projecting upwardly therefrom, said tube having an upper end which is intended to receive an air-driven supply of seed and a lower end arranged to distribute see into the furrow formed by the share.

13. A seed tine assembly for mounting on a frame component of a seed drilling implement, the assembly comprising:

a tine comprising an elongated, solid shaft, upright leg having an upper end which is intended to be mounted on the frame component and an opposing lower soil-engaging end, the tine further including a solid shaft base leg rearwardly projecting from the lower soil-engaging end of the upright leg;

a seed share mechanically bolted to the solid shaft base leg and arranged to form a furrow in the soil below the surface of the soil;

a tine point mechanically mounted on the lower end of the upright leg and projecting downwardly therefrom; and a supply tube mounted on the seed share at a distance from the tine and projecting upwardly therefrom, the tube having an upper end which is intended to receive an air-driven supply of seed and a lower end arranged to distribute seed into the furrow formed by the seed share.

14. An assembly according to claim 13, wherein:

(a) the tine point has an inside face with a groove formed thereon; and (b) the seed share terminates at a front apex received within the groove of the tine point.

* * * * *